United States Patent
Schmidt

[11] Patent Number: 5,243,247
[45] Date of Patent: Sep. 7, 1993

[54] BRUSH BRIDGE ASSEMBLY FOR A PERMANENT-MAGNET D.C. MOTOR

[75] Inventor: Andreas Schmidt, Oldenburg, Fed. Rep. of Germany

[73] Assignee: Licentia Patent-Verwaltungs-GmbH, Frankfurt am Main, Fed. Rep. of Germany

[21] Appl. No.: 906,285

[22] Filed: Jun. 29, 1992

[30] Foreign Application Priority Data

Jun. 27, 1991 [DE] Fed. Rep. of Germany ....... 4121202

[51] Int. Cl.$^5$ .................... H02K 11/00; H02K 5/14
[52] U.S. Cl. .................... 370/239; 310/72; 310/68 R; 310/71
[58] Field of Search .......... 310/40 MM, 43, 51, 68 R, 310/71, 72, 89, 220, 221, 239, 242, 245

[56] References Cited

U.S. PATENT DOCUMENTS

| | | | |
|---|---|---|---|
| 4,342,934 | 8/1982 | Van Wijhe et al. | 310/239 |
| 4,673,837 | 6/1987 | Gingerich et al. | 310/239 |
| 4,845,396 | 7/1989 | Huber | 310/239 |
| 4,851,730 | 7/1989 | Fushiya et al. | 310/239 |
| 4,896,067 | 1/1990 | Walther | 310/239 |
| 5,131,822 | 7/1992 | Yamamoto et al. | 310/245 |
| 5,148,073 | 9/1992 | Tamura | 310/239 |
| 5,159,222 | 10/1992 | Southall | 310/239 |

FOREIGN PATENT DOCUMENTS

| | | | |
|---|---|---|---|
| 0258132 | 3/1988 | European Pat. Off. | 310/239 |
| 0415367 | 3/1991 | European Pat. Off. | 310/51 |
| 1463897 | 7/1969 | Fed. Rep. of Germany . | |
| 2701161 | 7/1978 | Fed. Rep. of Germany . | |
| 0171149 | 7/1988 | Japan | 310/239 |
| 2044552 | 10/1980 | United Kingdom | 310/239 |
| 2095918 | 10/1982 | United Kingdom | 310/242 |

Primary Examiner—Steven L. Stephan
Assistant Examiner—C. LaBalle
Attorney, Agent, or Firm—Spencer, Frank & Schneider

[57] ABSTRACT

A brush bridge assembly for an electric motor an electrically insulating carrier body having a base plate having opposite inner and outer surfaces and a generally circular perimeter; and a cylindrical side wall extending axially from the perimeter of the base plate. The brush bridge assembly further has a plurality of brush guides supported on the inner surface of the base plate; a carbon brush supported in each brush guide for a radial displacement relative to a central axis of the carrier body; a spring connected to each carbon brush for urging the carbon brush radially inwardly; supporting elements mounted on the inner surface of the base plate in a uniform distribution; heat generating electric components and fixed contact terminals held in the supporting elements.

15 Claims, 2 Drawing Sheets

BRUSH BRIDGE ASSEMBLY FOR A PERMANENT-MAGNET D.C. MOTOR

CROSS REFERENCE TO RELATED APPLICATIONS

This application claims the priority of German Application No. P 41 21 202.9 filed Jun. 27, 1991, which is incorporated herein by reference.

BACKGROUND OF THE INVENTION

This invention relates to a brush bridge assembly for a permanent-magnet d.c. motor. The bridge assembly includes a carrier plate to which at least two brush guides are secured, each carrying a carbon brush. The carbon brushes are urged by means of biasing springs into contact with a commutator fixedly mounted on a rotor journalling in a cylindrical motor housing.

Brush bridge assemblies are known wherein the carrier plate (base plate) is made of an electrically insulating material and the brush guides are made of metal. The brushes of positive polarity are connected by an insulated cable whose ends are provided with terminals attached by screws to the associated brush components. The biasing springs are coil springs and exert a force on the associated brush with the interaediary of a pivotal lever. The brush is supported (guided) solely by the brush holder. Brush bridge assemblies of this type, because of the great number of individual components, are not adapted for an economical automatic mass manufacture. Furthermore, such known assemblies do not ensure a sufficiently vibration-resistant guidance of the brushes.

German Offenlegungsschrift (application published without examination) 14 63 897 disc loses a collector motor in which too, the brush bridge assembly is formed of a plurality of parts. It is a significant manufacturing disadvantage of the collector motor disclosed therein that one part of the brush bridge assembly is constituted by the motor housing itself which substantially affects the flexibility concerning the assembly and replacement of parts exposed to wear.

Further, brush bridge assemblies for two-pole, permanent-magnet d.c. motors manufactured by injection molding are also known where the components are affixed in a single plane on the base plate. It is a disadvantage of this arrangement that the concentration of heat sources is limited to a single zone.

Also, in German Offenlegungsschrift 27 01 161 a brush bridge assembly is disclosed which has a carrier plate (base plate) made of an insulating material. On a first side of the carrier plate carbon guides, a choke coil and terminal tabs are mounted. The carbon guides have claws which project through the carrier plate. Supporting plates, having transversely oriented projections are inserted between the claws and a second side of the carrier plate. The transverse projections extend through the carrier plate and support coil springs for elastically pressing the carbon brushes (displaceable in the carbon guides) against the commutator of a small motor. A further projection serves as a terminal tab, for example, to establish a plug-in connection through which current is supplied to an associated carbon brush. Holding plates have, on the second side of the carrier plate, U-shaped, integrally formed pockets. The supply of these components to the two plate sides is circumstantial and thus, for an automatic assembly very complicated and expensive apparatus is required. Also, the assembling periods are disadvantageously long.

SUMMARY OF THE INVENTION

It is an object of the invention to provide an improved brush bridge assembly of the above-outlined type which is more economical to manufacture and, with respect to installation or replacement during maintenance service, it is significantly easier to handle and ensures an increased operational safety for long service periods.

These objects and others to become apparent as the specification progresses, are accomplished by the invention, according to which, briefly stated, the brush bridge assembly for an electric motor includes an electrically insulating carrier body having a base plate having opposite inner and outer surfaces and a generally circular perimeter; and a cylindrical side wall extending axially from the perimeter of the base plate. The brush bridge assembly further has a plurality of brush guides supported on the inner surface of the base plate; a carbon brush supported in each brush guide for a radial displacement relative to a central axis of the carrier body; a spring connected to each carbo brush for urging the carbon brush radially inwardly; supporting elements mounted on the inner surface of the base plate in a uniform distribution; heat generating electric components and fixed contact terminals held in the supporting elements.

The invention provides an economically manufactured brush bridge assembly which is easy to handle and has the further advantage that structural elements to be mounted in the carrier body and to be electrically insulated, such as choke coils, brush guides and plug-in type terminals may be supplied in a technologically simple and time-saving manner to a single side of the carrier body. In this manner waste is effectively reduced. The electric plug-in connectors have a high mechanical strength and ensure a continuous, reliable service of the permanent-magnet d.c. motor.

Further, the brush bridge assembly provides a uniform distribution of components with respect to the removal of heat generated by the current in the choke coils, and also ensures the required distance from the coils of the rotor winding to take into account electromagnetic effects.

DESCRIPTION OF THE PREFERRED EMBODIMENT

Figure 1:
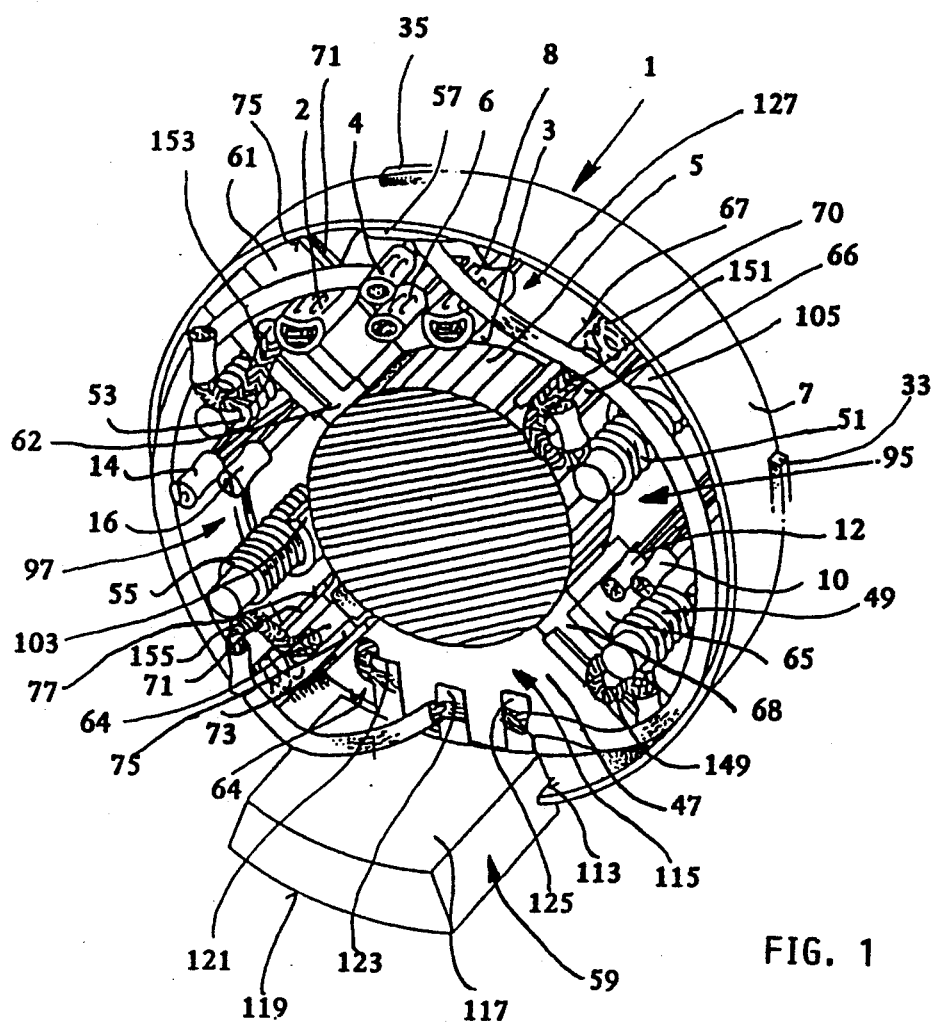
FIG. 1 is a perspective showing of a brush bridge assembly with the electric components according to a preferred embodiment of the invention, viewed from the inside.
Figures 2, 3:
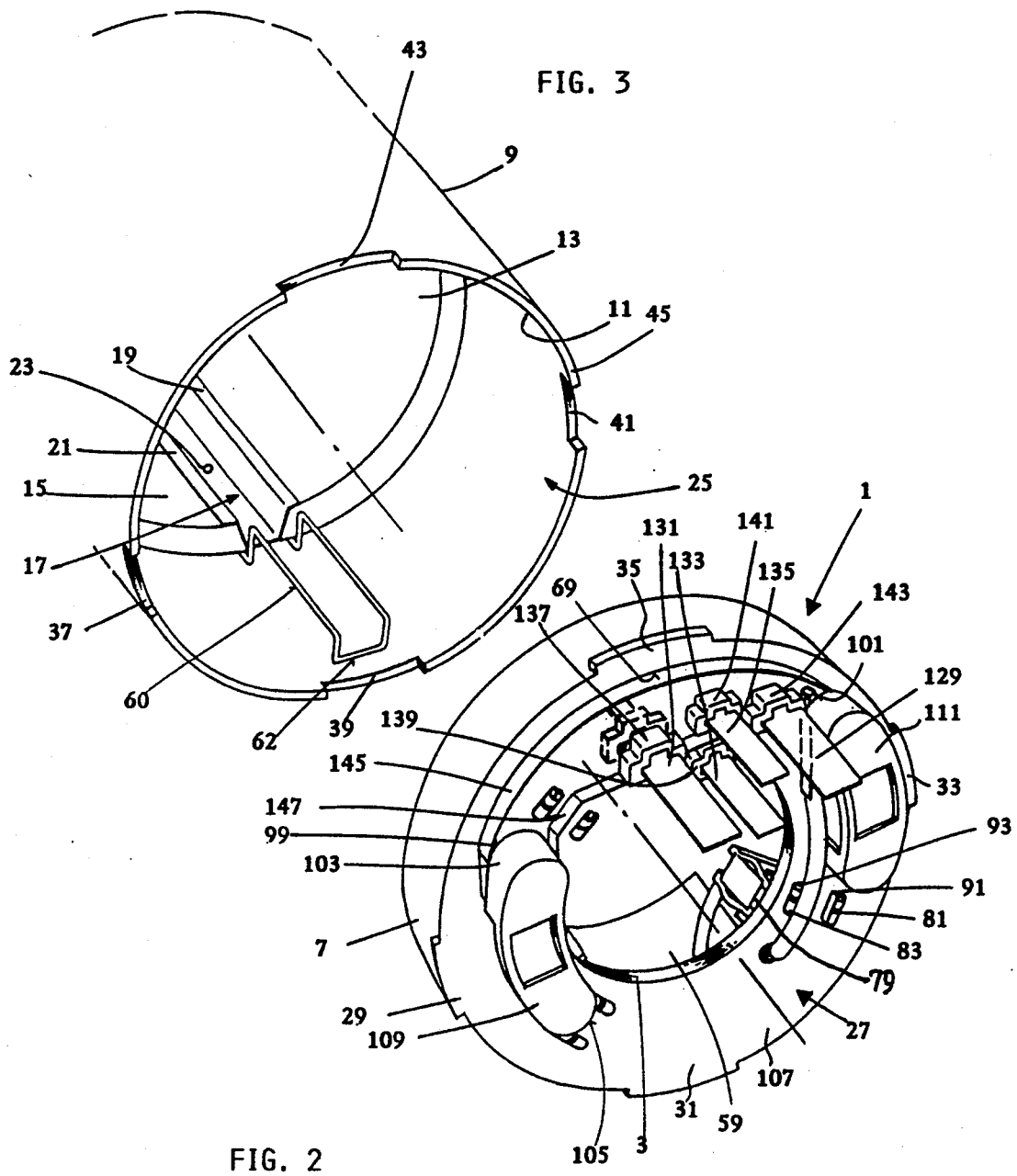
FIG. 2 is a perspective showing of the preferred embodiment of the brush bridge assembly, viewed from the outside.
FIG. 3 is a perspective view through an open side of a motor housing having permanent magnets and structured to accommodate the brush bridge assembly according to the invention.

Turning to FIG. 1, the brush bridge assembly includes a bowl-shaped carrier body 1 made of an electrically insulating synthetic material and formed of a generally cylindrical circumferential side wall 7 and a generally circular bottom or base plate 27. The latter has a central opening 3 through which projects a commutator 5 of a rotor forming part of a permanent-magnet d.c. motor not shown in further detail. As shown in FIG. 3, the carrier body 1 is insertable into a cylindrical motor housing 9 which, on its inner circumferential face 11, supports permanent magnets 13 and 15. The latter are pressed against the inner circumferential surface 11 by a holding plate 17, provided with abutment faces 19 and 21. The holding plate 17 is mounted by screws 23 on the motor housing 9. The bottom plate 27 of the carrier body 1 has stop lugs 29, 31, 33 and 35 which project radially beyond the bottom plate 27 and which fit into complemental recesses 37, 39, 41 and 43 provided in the terminal edge face 45 of the motor housing 9. This arrangement determines the axial position of the carrier body 1 in the housing 9. The outer diameter of the side wall 7 of the carrier body 1 and the inner diameter of the housing 9 are so selected that a tight seating of the carrier body 1 in the housing 9 is achieved. The projecting stop lugs 29, 31, 33 and 35 have a radial length which corresponds to the wall thickness of the motor housing 9.

On the inner face 47 of the radial bottom plate 27 of the carrier body 1 holding elements are provided for a uniform distribution of all heat producing electrical elements such as choke coils 49, 51, 53 and 55, a capacitor 57, a resistor 59 as well as fixed contacts. Further, there are provided four brush guides 61, 63, 65 and 67 for the carbon brushes 62, 64, 66 and 68 which are supported on the inner bottom face 47 and which are essentially of rectangular configuration. They are arranged in a radial orientation to the center bore 3 and are at 90° spaced from one another. The brush guides 61, 63, 65 and 67 which are made of metal, such as brass or Zamak (zinc die-casting alloys), are immobilized on the bottom surface 47 by respective guide edges 71 and 73 which extend from the inner circumferential surface 69 of the carrier body wall 7 to the central bore 3 and which are arranged parallel to one another. The guide edges 71, 73 form-fittingly engage counter stop edges 75, 77 of the brush guides 61, 63, 65 and 67. Also referring to FIG. 2, the brush guides 61, 63, 65 and 67 have at their underside 79 which serves as a supporting surface, claws 81 and 83 which project through openings in the bottom plate 47 and which are anchored behind engagement webs 91 and 93 secured to the external face 107 of the bottom plate 27. In this manner the brush guides 61, 63, 65 and 67 are securely and fixedly connected with the carrier body 1. The carbon brushes 62, 64, 66, 68 supported in the brush guides 61, 63, 65 and 67 are held securely in resilient contact with the commutator 5 by means of respective compression springs 70. This arrangement ensures a compact support for the carbon brushes 62, 64, 66 and 68.

In two oppositely located intermediate spaces 95 and 97 between the brush guides 61, 63 and 65, 67, respectively, two choke coils 53, 55 and, respectively 49, 51 are arranged in holding devices in an orientation which is perpendicular to the bottom face 47. For this purpose the base plate 27 has, in the region of the intermediate spaces 95 and 97, throughgoing slots 99 and 101 arranged concentrically to the circumferential wall 7 of the carrier body 1. The slot openings 99 and 101 reach up to the inner guide webs 71, 73 of two pairs of brush guides 61, 63 and 65, 67, respectively. At the ends of the slots 99, 101, semicircular cradle members 103, 105 are provided for the choke coils 49, 51, 53 and 55. The choke coils project from the bottom plate 27 to such an extent that the ends of the fixed contacts 2, 4, 6, 8, 10, 12, 14 and 16 of the choke coils 49, 51, 53 and 55 lie in a single plane. The openings of two semicircular receiving cradles 103, 105 are oriented towards one another and the free ends thereof are closed by a common base plate 109, 111 on the outer bottom race 107. By means of a staggered height positioning, the interference-suppressing elements (choke coils) are arranged in a space-saving manner in the carrier body 1 with an efficient utilization of the available space.

The carrier body 1 further supports the resistor 59 which constitutes an rpm-regulating element and which is situated in a recess 113 provided in the circumferential wall 7 of the carrier body 1. The recess 113 is situated in the intermediate space 115 between the brush guides 63 and 65. The resistor 59 has an inner arcuate surface 117 arranged concentrically to the wall 7 of the carrier body 1 and a correspondingly configured outer surface 119. Thus, the resistor 59 has the shape of a partial hollow cylinder having three contact terminals 121, 123 and 125 arranged on the inside and extending radially inwardly. In the installed state of the carrier body 1 in the motor housing 9, the external surface 119 of the resistor 59 lies against the inner circumferential surface 11 of the motor housing 9 so that a secure heat removal is ensured. A secure contacting of the resistor 59 with the inner circumferential surface 11 of the motor housing 9 is further supported by immobilizing the resistor 59 and pressing it against the inner circumferential surface 11 of the motor housing 9 by means of a U-shaped spring yoke 60. In the installed state of the carrier body 1, an angularly bent part 62 forming the free terminal of the yoke 60 locks behind a locking edge 64 of the resistor 59, whereby the outer surface 119 of the resistor 59 is pressed against the inner circumferential surface 11 of the housing 9.

In the intermediate space 127 between the brush guides 61 and 67, in the vicinity of the side wall 7 of the carrier body 1 there is arranged a capacitor 57. In the intermediate space 127 there are also arranged four tubular, pinched terminals 2, 4, 6, 8 having respective terminal tabs 129, 131, 133 and 135 which are supported in a self-locking manner in holding devices 137, 139, 141 and 143 which are formed as integral members with the bottom plate 27 of the carrier body 1. The holding devices 137, 139, 141 and 143 have non-illustrated locking edges in slots, behind which the terminal tabs 129, 131, 133 and 135 lock with resilient lugs during assembly. The holding devices 137, 139, 14 and 143 are T-shaped and project in both directions from the bottom plate 27, that is, from the inner face 47 and the outer face 107 thereof. The terminal tabs 129, 131, 133 and 135 may thus be secured to the carrier base 1 in a very simple manner by means of self-locking plug-in connection.

In the intermediate spaces between the choke coils 51, 53 and 55, 57, on each side of the slots 99, 101 there are supported tubular, pinched terminal members 10, 12 and 14, 16, respectively. The choke coils 51, 55 and 53, 57 and the brush guides 61, 65 and 63, 67 of the same polarity are connected by conductor strips 145 and 147.

The conductor strips 145 and 147 too, permit an automatic assembly of the electric structural elements onto the carrier body 1. The free ends of the electric elements supported on the inner face 47 of the bottom plate 27, such as the choke coils, the fixed contacts and stranded conductors 149, 151, 153 and 155 connecting the choke coils with the brushes, are situated approximately at the same height to thus ensure that these electric components may be mounted and immobilized from one side in corresponding holding components. Only the terminal tabs 129, 131, 133, 135 and the two conductor strips 145 and 147 are arranged on the outer face 107 of the bottom plate 27.

The securement of the electric structural elements, particularly the interference-suppressing elements on the carrier body 1 is thus effected by molded-on components in which the structural elements are secured by self-locking. In this manner, an adaptation of the brush bridge assembly to various power and configurational requirements is feasible by using the appropriate molds in the injection-molding tool. A reduction of the labor involving the establishment of connections under narrow spatial conditions is achieved by separately performable assembling of the brush bridge assembly. It is a further advantage of the brush bridge assembly according to the invention that the heat generating components it supports are spatially uniformly distributed.

It will be understood that the above description of the present invention is susceptible to various modifications, changes and adaptations, and the same are intended to be comprehended within the meaning and range of equivalents of the appended claims.

What is claimed is:

1. A brush bridge assembly for an electric motor, comprising
    (a) an electrically insulating carrier body having
        (1) a base plate having opposite inner and outer surfaces and a generally circular perimeter;
        (2) arcuate throughgoing slots provided in said base plate; and
        (3) a cylindrical side wall extending axially from the perimeter of said base plate;
    (b) a plurality of brush guides supported on said inner surface of said base plate; said brush guides having mounting webs;
    (c) a carbon brush supported in each said brush guide for a radial displacement relative to a central axis of said carrier body;
    (d) a spring connected to each said carbon brush for urging said carbon brush radially inwardly;
    (e) supporting elements mounted on said inner surface of said base plate in a uniform distribution;
    (f) heat generating electric components held in some of said supporting elements; said heat generating electric components including four choke coils grouped in two diametrically oppositely located pairs situated in two intermediate spaces between circumferentially adjoining brush guides; said arcuate throughgoing slots being provided in said intermediate spaces and being oriented concentrically to said side wall and extending to said mounting webs of adjacent said brush guides;
    (g) fixed contact terminals held in some of said supporting elements;
    (h) choke coil holders affixed to said inner surface of said base plate; each said choke coil holder supporting a separate one of said choke coils in an orientation perpendicular to said inner surface of said base plate; said choke coil holders comprising semicircular receiving cradles situated at ends of said slots for accommodating said choke coils; said cradles having lateral openings; the lateral openings of adjoining cradles being oriented towards one another;
    (i) stationary contacts supported by said carrier body; said receiving cradles projecting to such a distance from said base plate that ends of said stationary contacts and said choke coils lie in a single plane; and
    (j) bottom supporting members insulated at said outer surface of said base plate; said bottom supporting members supporting said choke coils and closing an open end of said cradles.

2. The brush bridge assembly as defined in claim 1, in combination with an electric motor; said electric motor having a generally cylindrical motor housing having a terminal edge face defining a housing opening; said carrier body being fitted by axial insertion coaxially in said opening; and means for fixing an axial position of said carrier body in said motor housing.

3. The brush bridge assembly as defined in claim 2, wherein said means for fixing an axial position includes stop lugs forming part of said carrier body and extending radially outwardly from said perimeter of said base plate; and recesses provided in said terminal edge face of said motor housing; said recesses form-fittingly accommodating said stop lugs.

4. The brush bridge assembly as defined in claim 3, wherein said motor housing has a wall thickness and further wherein said stop lugs have a radially measured length equalling said wall thickness.

5. The brush bridge assembly as defined in claim 1, wherein said base plate has a central circular opening for the passage of a motor commutator; further wherein said brush guides are four in number and are arranged in a uniform distribution centrally about the circular opening; each said brush guide having a generally rectangular configuration and including opposite, radially extending mounting edges; further comprising four pairs of mounting strips secured to said inner surface of said base plate; each pair of mounting strips securing a different said brush guide to said base plate; each pair of mounting strips including two parallel-spaced mounting strips extending from said cylindrical side wall to said circular opening; each mounting strip being in a form-fitting engagement with a separate one of said mounting edges of a respective said brush guide.

6. The brush bridge assembly as defined in claim 5, wherein said brush guides are of metal and each having a bottom face being in engagement with said inner surface of said base plate; further comprising securing webs formed on each said bottom face and extending through apertures in said bas plate; each said securing web having opposite ends carrying a claw; further comprising locking webs affixed to said outer surface of said base plate adjacent respective said apertures in said base plate; said claws being anchored behind said locking webs.

7. The brush bridge assembly as defined in claim 1, further comprising apertures provided in said base plate; said bottom supporting members are connected with one another in said apertures.

8. The brush bridge assembly as defined in claim 1, wherein said side wall of said base plate has a recess in one of said intermediate spaces; further comprising a resistor being shaped as a cylindrical shell segment and including three spaced contact terminals; said resistor being accommodated in said recess and being concentric with said side wall; said contact terminals of said resistor extending radially inwardly.

9. The brush bridge assembly as defined in claim 8, in combination with an electric motor; said electric motor having a generally cylindrical motor housing having a terminal edge face defining a housing opening and an inner cylindrical face; said carrier body being fitted by axial insertion coaxially in said opening; means for fixing an axial position of said carrier body in said motor housing; said resistor having an outer radius of curvature equalling that of said side wall of said carrier body; said resistor being in a face-to-face contact with said inner cylindrical face of said motor housing.

10. The brush bridge assembly as defined in claim 1, further comprising a capacitor supported in said carrier body in one of said intermediate spaces adjacent said side wall; further comprising a plurality of tubular, pinched terminal conductors situated in said one intermediate space; a terminal tab attached to each said terminal conductor; a plurality of tab holders held in said base plate and projecting from said outer surface of said base plate; said terminal tabs being held locked in said tab holders.

11. The brush bridge assembly as defined in claim 10, further comprising a resilient lug formed on each terminal tab; each said resilient lug being locked to a respective said tab holder.

12. The brush bridge assembly as defined in claim 10, wherein said tab holders have a T-shaped cross section and project in both directions through said base plate.

13. The brush bridge assembly as defined in claim 10, wherein said terminal tabs are located externally of said carrier body, on said outer surface of said base plate.

14. The brush bridge assembly as defined in claim 1, further comprising tubular, pinched terminal members supported in said carrier body on either side of said slots in intermediate spaces between said choke coils; and conductor strips connecting with one another the choke coils and the brush guides of equal polarity.

15. The brush bridge assembly as defined in claim 14, further comprising conductor strands connecting said choke coils with said brushes; further wherein said conductor strands and free ends of said choke coils and said stationary contacts are situated at the same height level in said carrier body above said inner surface of said base plate; and further wherein said conductor strips are located externally of said carrier body, on said outer surface of said base plate.

* * * * *